United States Patent [19]

Seymour

[11] Patent Number: 4,692,055
[45] Date of Patent: Sep. 8, 1987

[54] UNIFASTENER

[76] Inventor: Paul F. Seymour, 1104 Stillwater Dr., Jupiter, Fla. 33458

[21] Appl. No.: 598,033

[22] Filed: Apr. 9, 1984

[51] Int. Cl.$^4$ .............................................. F16B 7/08
[52] U.S. Cl. .................................. 403/190; 403/234; 403/237
[58] Field of Search ...................... 403/190, 237, 234; 411/55, 60, 57

[56] References Cited

U.S. PATENT DOCUMENTS 2,018,250  10/1935  Cohan ................................. 403/237
3,598,433  8/1971  Savickas ............................. 403/190
3,850,534  11/1974  O'Halloran ......................... 403/190

FOREIGN PATENT DOCUMENTS 598918  10/1925  France ................................. 411/55
6505901  11/1965  Netherlands ......................... 411/55
1232489  5/1971  United Kingdom ................. 403/234

Primary Examiner—Andrew V. Kundrat

[57] ABSTRACT

A pipe fitting of expandable plastic material for joining plastic pipes as used in the manufacture of P.V.C. furniture with fittings and the fastening device being molded together as one unit.

1 Claim, 6 Drawing Figures

UNIFASTENER

BACKGROUND OF THE INVENTION

An entire industry has grown around the manufacture of furniture from sections and pieces of P.V.C. pipe and fittings. Overall such furniture looks good to the eye but the pipe to pipe joints detract from it's beauty. Heretofore, P.V.C. furniture has been fabricated using both standard and special design slip fittings that have the look of ordinary plumbing.

P.V.C. fittings are being made that are applied to the outer wall of a receiving pipe; such fittings are know to the trade as 'saddle' type. Heretofore, the methods used to fasten said fittings to a pipe componant have been found lacking in many ways. One method is the application of any ordinary nut and bolt; bolt is inserted thru center of said fitting and into a drilled hole of receiving pipe componant. The 'saddle' end fits snug against pipe wall and is drawn tight after a nut is applied from inside of said pipe. The nut must be held manually to prevent turning while bolt is being tightened. It is evident that this method is possible only at open ends of a receiving pipe where the nut can be held. Fastening of said fitting away from an open end requires an access hole be drilled thru other side of receiving pipe so that the nut can be applied and tightened. A plastic plug is then inserted into the said access hole for cosmetic appearance. An other method uses a "U" clip pushed under a bolt head to hold said fitting in place. Manual application from inside of receiving pipe is again required, thus limiting the use to pipe ends. Other means used require the fastening bolt be inserted completely thru the receiving pipe and the fitting being attached. This method leaves the bolt head exposed and unsightly.

SUMMARY OF THE INVENTION

In an effort to produce neat joints that go together quickly and easily the instant invention utilizes the flexibility and expanding properties of the P.V.C. material of which the fitting units are fabricated, i.e. (polyvinylchloride). Accordingly several objects of my invention are as follows:

It is an object of the instant invention to provide a quick and easy fastening device and operation for the joining of multiple pipe ends, made of a plastic such as P.V.C, for use other than the transport of liquids.

It is a further object of the instant invention to modify any type or size plastic 'saddle' style fittings so that said fitting and the fastening device or means are molded together as one unit when said fitting is manufactured.

It is still a further object of the instant invention to join multiple pipe ends at any distance from an open and distal end.

It is still a further object of the instant invention to join multiple pipe ends without requiring any parts to be held or tightened from the inside of any such joint.

It is still a further object of the instant invention that pipes of one dimmension can be fastened to each other.

It is still a further object of the instant invention that a pipe of one O.D. can be fastened to a pipe of larger O.D.

It is still a further object of the instant invention that any variable thickness of the receiving pipe wall will not effect application of said invention.

BRIEF DESCRIPTION OF THE DRAWING

Further objects and advantages of the instant invention will become apparent from the following specifications taken together with the accompanying drawing in which.

DESCRIPTION OF THE PREFERRED EMBODIMENT

Figure 1:
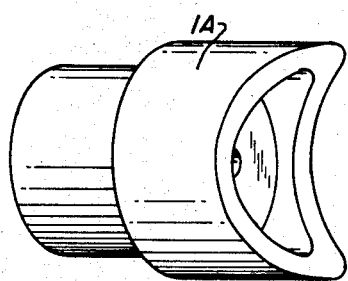
FIG. 1 is a side view of a 'saddle' fitting as now being used and made and is designated "Prior Art".

FIG. 1 is designated as "Prior Art" and is made and used by the trade for pipe to pipe installation. Said prior art is known as a 'saddle' type fitting.

Figure 2:
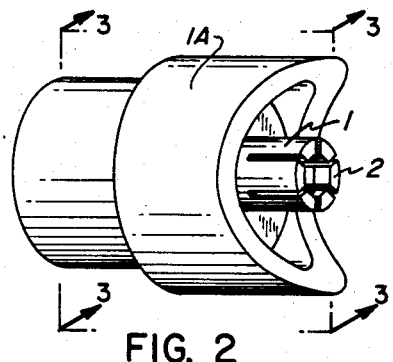
FIG. 2 is a side view of the basic 'saddle' fitting showing the addition of the improvement and marked as section 1.

FIG. 2 is the basic fitting as shown in FIG. 1 with the addition of the improvement marked section 1.

Figure 3:
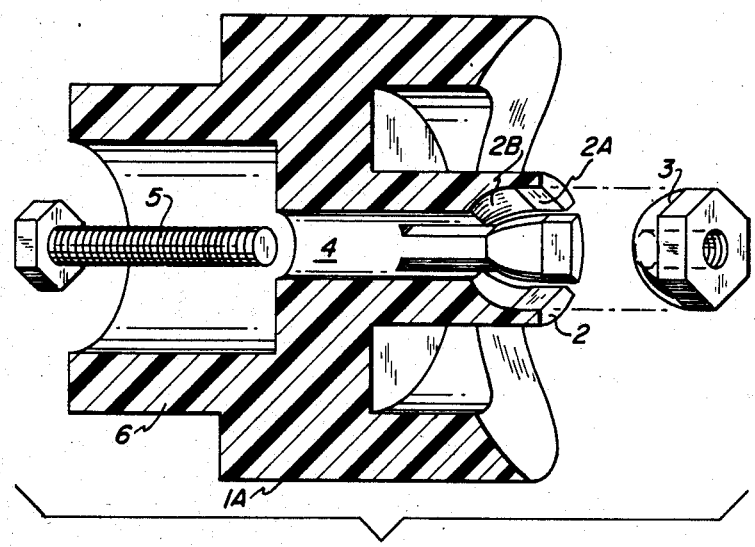
FIG. 3 is a cut-a-way view of FIG. 2 showing details of said section 1

FIG. 3 shows the addition of the invention section 1 as it is molded into the basic unit 1A. Said section 1 being a circular nipple segmented lengthwise into six equal parts 2. Each segment 2 is independent of the other. The open end of said segmented nipple 1 has a recessed socket section 2A. Said socket 2A is molded in the shape of a hex head acorn nut 3. Directly below section 2A is a hemi-spherical recess 2B. The combination of 2A and 2B complements exactly the shape and size of the functional means or acorn nut being used.

Figure 4:
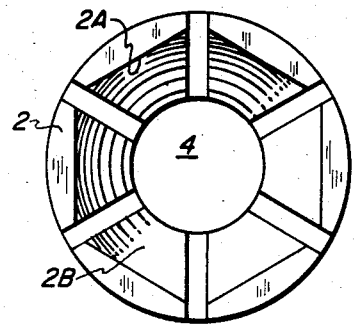
FIG. 4 is a top view of section 1 showing the segmented sections and the recessed socket.

In FIG. 4 looking down into the open end of segmented nipple 1 each separate segment 2 can be seen. The hex socket 2A is outlined along with recess 2B, bolt hole 4 is shown at center.

Figure 5:
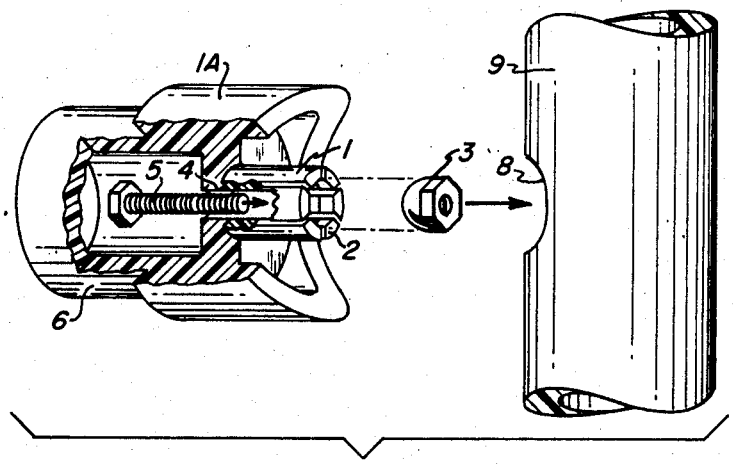
FIG. 5 is a blow up view of all functional parts in proper order.

In FIG. 5 the componant parts are shown in proper order before assembly. In the assembly a hole or aperture 8 is provided in a receiving pipe 9; said hole provides a slip fit for insertion of assembled section 1. Wedge or acorn nut 3 is set into socket 2A. The function of the wedge nut is to exert pressure on the interior wall of section 1 and thereby expand the segments 2. Said socket 2A being the same shape as the wedge nut 3 will prevent the said nut 3 from turning. Bolt 5 is inserted into hole 4 and threaded into wedge nut 3 until said nut 3 bottoms out with pressure. Assembled section 1 is inserted into hole 8 of receiving pipe 9. Torque is applied to head of bolt 5 which is drawn up tight. As bolt 5 is tightened the wedge nut 3 slides up wall 4 thereby spreading and expanding the segments 2 of section 1 apart. Said segments 2 lock behind inner wall of receiving pipe 9.

Figure 6:
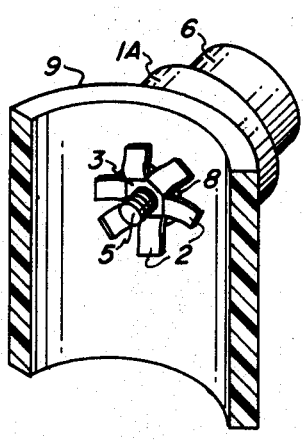
FIG. 6 is a cut-a-way view of the invention after section 1 has been installed in place and expanded.

FIG. 6 shows an interior view of a piece of pipe with the invention completely installed. The wedge nut 3 has spread the segments 2 of section 1 apart. Said segments being fully locked behind inner wall of pipe 9.

While the above description contains many specifities, these should not be construed as limitations on the scope of the invention, but rather as an exemplification of one preferred embodiment thereof. Many other variations are possible, for example; wedge means can be any conical shaped unit having opposing edges, fins, or protrusions that will engage into a fissure of compatable shape. The said fissure being the inner wall of expanding nipple 1. Said conical means can be formed as the head of bolt 5. Said bolt 5 would then be inserted from open end of section 1; a standard nut being applied on bolt 5 from open end of nipple 6 of unit 1A. Another arrangement is to have the inner wall of the nipple section 1 formed square to provide a socket for a special bolt 5. The special bolt 5 in this application would be classified as a 'counter sunk carriage bolt'; the taper section of such a bolt would act as the wedge, the square section under the taper would lock into the matching square center of the nipple section 1.

Accordingly the scope of the invention should be determined not by the embodiment illustrated, but by the appended claims and their legal equivalents. Therefore,

I claim:

1. A Joint fitting for connecting a pair of tubular members, are being provided with an aperture in its wall, comprising a plug having a longitudinal bore therethrough adapted at one end to fit into an end of one of the members and having a split projection at the other end adapted to enter the aperture of the other member, and expansion means longitudinally movable in the split projection for expanding the split projection on the plug for clamping engagement with the other member, said split projection terminating in a split socket having plural segments with each segment having extending axially from its free end a planar internal face and arcuate internal face together forming a socket having a generally spherical bottom and planar sides, said expansion means being a bolt extending thru said longitudinal bore and a threaded nut thereon having a generally spherical bottom at one end and terminating in planar sides at the other end for non-rotative engagement with said split socket.

* * * * *